United States Patent [19]

Russ

[11] Patent Number: 4,887,490
[45] Date of Patent: Dec. 19, 1989

[54] SEQUENTIAL MECHANICAL MODE SHIFTER

[75] Inventor: David E. Russ, Rockford, Ill.

[73] Assignee: Sundstrand Corporation, Rockford, Ill.

[21] Appl. No.: 218,889

[22] Filed: Jul. 14, 1988

[51] Int. Cl.⁴ .............................................. B60K 41/00
[52] U.S. Cl. ................................. 74/844; 74/665 GA; 244/137.1; 414/495
[58] Field of Search ................. 74/843, 845, 846, 848, 74/850, 665 F, 665 G, 665 GA; 414/345, 347, 380, 398, 495; 244/137.1

[56] References Cited

U.S. PATENT DOCUMENTS

| | | | |
|---|---|---|---|
| 792,572 | 6/1905 | Deeley et al. | 74/435 |
| 1,242,260 | 10/1917 | Stone | 200/47 |
| 1,696,049 | 12/1928 | Miller | 74/401 |
| 1,748,390 | 2/1930 | Otto | 74/435 |
| 1,787,342 | 12/1930 | Flowers | 298/21 R |
| 1,833,644 | 11/1931 | Haegele | 74/435 |
| 2,259,948 | 10/1941 | Bullard, III | 29/50 |
| 2,304,960 | 12/1942 | Schane | 268/74 |
| 2,589,940 | 3/1952 | Hayek | 74/436 |
| 2,926,012 | 2/1960 | Maher | 268/16 |
| 2,927,624 | 3/1960 | Hughes | 154/1.8 |
| 2,931,242 | 4/1960 | Pickles | 74/848 |
| 3,058,366 | 10/1962 | Matthews | 74/435 |
| 3,153,951 | 10/1964 | Whelan | 74/848 |
| 3,220,278 | 11/1965 | Miller | 74/425 |
| 3,260,128 | 7/1966 | Gassino et al. | 74/435 |
| 3,326,058 | 6/1967 | Morrison | 74/393 |
| 3,387,570 | 6/1968 | Pulcrano et al. | 105/282 |
| 3,408,021 | 10/1968 | Nichols | 242/84.54 |
| 3,473,390 | 10/1969 | Brown et al. | 74/1 |
| 3,530,734 | 9/1970 | Wray et al. | 74/424.8 |
| 3,792,618 | 2/1974 | Worrix | 74/89.15 |
| 3,808,969 | 5/1974 | Pearce | 101/72 |
| 3,926,072 | 12/1975 | Richardson | 74/665 GA X |
| 3,965,618 | 6/1976 | Pickles | 49/103 |
| 3,965,815 | 6/1976 | Lupkas et al. | 74/665 GA X |
| 3,972,427 | 8/1976 | Stanley et al. | 414/495 |
| 4,003,267 | 1/1977 | Busch | 74/84 R |
| 4,090,410 | 5/1978 | Nakamura | 74/414 |
| 4,302,870 | 12/1981 | Schalles et al. | 29/40 |
| 4,310,087 | 1/1982 | Gawler | 192/142 R |
| 4,466,310 | 8/1984 | Rulseh | 74/665 GA |
| 4,488,326 | 12/1984 | Cherry | 414/495 |
| 4,573,566 | 3/1986 | Roman | 198/461 |

Primary Examiner—Dwight G. Diehl
Attorney, Agent, or Firm—Antonelli, Terry & Wands

[57] ABSTRACT

An improved system (10 and 100) is disclosed in which a plurality of actuation systems (12 and 14) are activated in a timed sequence by a single prime mover (16). The prime mover is coupled to a transmission (18) which drives the first and second actuation systems for moving the first and second actuation systems between the first and second positions and back to the first position. A timer (34) is provided for controlling the timing of activation systems between the first and second positions and back to the first position. The present invention maintains precise synchronism in the actuation of the first and second actuation systems without separate power units.

19 Claims, 5 Drawing Sheets

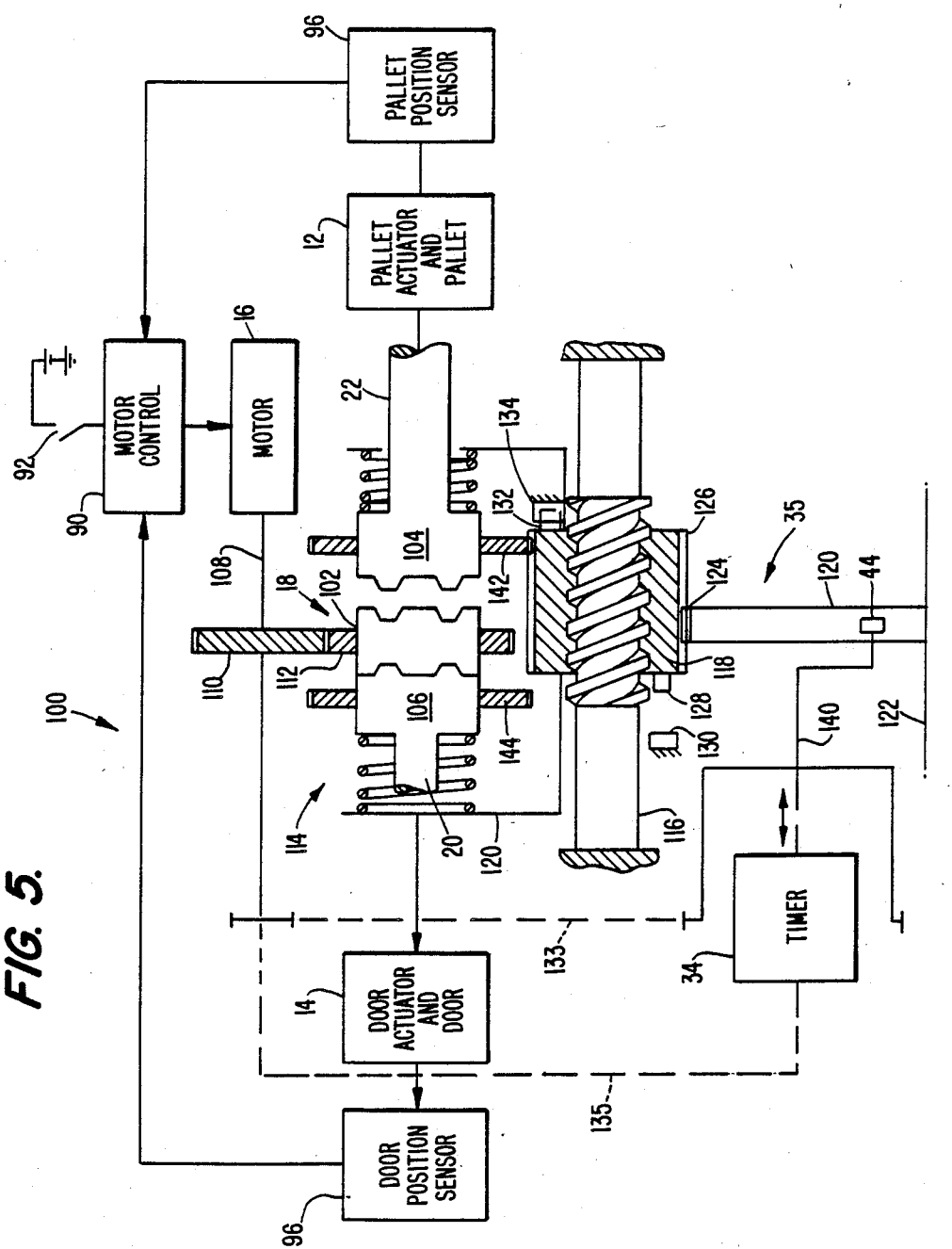

SEQUENTIAL MECHANICAL MODE SHIFTER

TECHNICAL FIELD

The present invention relates to systems for actuating a plurality of mechanical mechanisms in a timed sequence with a single power source. More particularly, the present invention relates to mechanical actuators of the aforementioned type which are useful in aircraft applications.

BACKGROUND ART

In aircraft actuation applications, separate actuation systems are conventionally powered by either separate power units or mechanical shifting devices. Separate power units are undesirable in terms of weight, volume, interfacing and mounting complexity. Mechanical shifting devices typically utilize clutches to establish sequential application of power from a single prime mover to the actuation systems. Due to slippage, the use of clutches to sequentially actuate separate actuation systems can cause synchronizing problems when precise timing between actuation systems is required.

DISCLOSURE OF INVENTION

The present invention utilizes a single power drive unit to sequentially activate a plurality of actuation systems which require sequential synchronized operation to move each actuation system between first and second positions and back to a first position while maintaining a positive mechanical link at all times with both of the actuation systems. The direct mechanical link at all times with each of the actuation systems guarantees positional accuracy. The present invention is fully mechanically synchronized by mechanical logic which is not dependent upon friction. The inverse geneva mechanism provides smooth, controlled acceleration of the output while providing dwells in speed which facilitate engagement and disengagement of the jaw clutch and provides a smoother velocity profile than a regular geneva mechanism of similar size. The axial cam of the present invention is advantageous over traditional cams in that the slot prevents unwanted float without having to utilize springs. During the sequential operation, power is applied first to a first actuation system and thereafter to a second actuation system, the second actuation system is reversed in direction to move it back to the first position and then finally the first actuation system is reversed in direction to move it back to the first position by power supplied from the single power drive unit without loss of sequencing and timing of power to the outputs. An application of the present invention is the sequential opening of cargo bay doors and the lowering of a pallet through the open door, the raising of the pallet through the open doors and the closing of the cargo bay doors. One embodiment of the invention transfers the inertia of each activation system to the other actuation system during the sequence of transferring power.

A system for sequentially activating a plurality of activation systems in a timed sequence in accordance with the invention includes a first actuation system to be actuated to move between a first position and a second position and back to the first position; and a second to be actuated to move between a first position and a second position and back to the first position, the motion of the second actuation system occurring sequentially after the motion of the first mechanism. A transmission is provided which has an input connected to a motor, a first output mechanically connected to the first actuation system and a second output mechanically connected to a second output.

In a first embodiment, the first output is free to rotate from a first position to near a second position while the second output is fixed. Thereafter, both outputs rotate together while the first output is decelerated and the second output accelerated. Next, the first output is fixed and the second output driven from position in the first position to the second position. Finally, the motor is reversed to bring the second output back to the first position and the first output back to the first position.

In a second embodiment of the invention, the first actuation system is connected to the input when the first actuation system is at the first position and is disengaged from the input when the first actuation system is at the second position. The second actuation system is connected to the input when the first actuation system is near the second position and is disengaged from the input when the first actuation system is approaching the first position. Both outputs of the actuation systems rotate during a common time interval of the sequential activation of the actuation systems.

In both embodiments, a synchronizer synchronizes the rate of rotation of one of the first and second outputs, which is not connected to the input prior to engagement with the input, with the rate of rotation of the input and a timer controls the timing of moving the first and second actuation systems between the first and second positions and back to the first position. The embodiments further include an activator for activating the motor and when the motor is initially activated the actuation systems are positioned in a first position and the first actuation system is driven by the transmission from the position towards the second position with the second actuation system being stopped during initial activation of the motor. Thereafter the timer causes the transmission to deactivate movement of the first actuation system when the first actuation system reaches the second position, the transmission drives the second actuation system from the first position to the second position at a time after the first actuation system has started to move to the second position. When the second actuation system reaches the second position, the activator of the motor reverses a direction of rotation of power applied to the transmission by the motor and the transmission causes the second actuation system to move from the second position toward the first position, the timer causes the transmission to stop actuation of the second actuation system when the second actuation system reaches the first position, the transmission drives the first actuation system from the second position to the first position, and when the first actuation system reaches the first position, the activator deactivates the motor. The second embodiment may utilize a grounding mechanism like the grounding mechanism of the first embodiment as an integral part of the inverse geneva mechanism.

In the first embodiment, the transmission includes a differential, a grounding mechanism, for preventing rotation of the first output during a substantial portion of the driving of the second actuation system; a grounding mechanism, for preventing rotation of the second output during at least a portion of the driving of the first actuation system; and wherein the timer causes the mechanisms for grounding the first and second outputs to sequentially ground the second output and the first output. The grounding mechanism for ground the second output includes a jaw clutch movable between first and second positions with the second position permitting the second output to rotate and the first position preventing the second output from rotating; a shifter for shifting the clutch from the first position to the second position and from the second position to the first position in response to the timer with the timer causing the clutch to be positioned in the first position during a time interval that the first output is free to rotate.

The transmission of the first embodiment further includes a gear, coupled to the first output with the gear having a plurality of teeth extending around an outer circumference of the gear; a wheel rotationally mounted and having a plurality of teeth mounted thereon extending partially around an outer circumference and which engage the teeth of the gear when the wheel is rotated to a circumferential position in which the teeth of the wheel face the gear; and wherein the timer causes the wheel to be accelerated to a rotational velocity matching a rotational velocity of the gear by a time at which the teeth of the gear and the wheel engage and the clutch is moving from the first position to the second position. An inverse geneva mechanism is provided within the wheel with the inverse geneva mechanism having a slot extending radially outward from an axis of rotation. A mechanism is provided for engaging the slot of the inverse geneva mechanism and causing rotation of the inverse geneva mechanism to accelerate the wheel up to a rotational velocity of the gear during movement of the clutch from the first position to the second position and thereafter causing rotation of the inverse geneva mechanism to decelerate the wheel and the gear to prevent the first output from rotating. The grounding mechanism for preventing rotation of the first actuation system includes a stop for stopping rotation of the wheel; a stop carried by the wheel which is engaged by the same mechanism used to engage the inverse geneva slot to prevent the first actuation system from rotating. The mechanism for engaging includes a pin mounted on a rotatable radius with the radius being axially movable between first and second positions; a mechanism for rotating and moving the pin between the first and second axially positions to cause the pin to move in a helix with the pin engaging the slot of the inverse geneva mechanism when the radius is moving toward the second axial position. Further in accordance with the first embodiment of the invention the timer causes the wheel to be accelerated to cause the jaw clutch to move from the second position to the first position and thereafter causes the wheel to be decelerated after the teeth of the gear and the wheel disengage.

In the second embodiment of the invention the input is axially fixed in position; and the first and second outputs are spaced apart by a fixed distance and are axially movable with respect to a rotating element of the first input between first and second positions; at the first position the rotating element only engages the first output to apply rotary power thereto and at the second position the rotating element only engages the second output to apply rotary power thereto; and further includes a shifting mechanism, responsive to the timer for shifting the first and second outputs axially between the first and second positions and back to the first position to sequentially engage the first and second outputs. At the first position, the second output is preferably grounded. The shifting mechanism includes a threaded shaft which is fixed to prevent rotation, a gear having a threaded bore which engages the threaded shaft and having an outside circumference with gear teeth; a wheel, driven by the timer, having teeth on an outside periphery which engages the teeth of the gear, the wheel causing the gear to traverse along the threaded shaft between a first position to a second position in response to the timer causing the wheel to rotate in a first direction and the wheel causing the gear to traverse along the threaded shaft between the second position and the first position in response to the timer causing the wheel to rotate in the second direction. The wheel has an inverse geneva mechanism with a radially outward extending slot and further includes a pin mounted on a radius with the radius being axially movable between first and second positions; and a mechanism for rotating and moving the pin between the first and second axially positions to cause the pin to move in a helix with the pin engaging the slot of the inverse geneva mechanism when the radius is moving toward the second position.

BRIEF DESCRIPTION OF DRAWINGS

FIG. 5 illustrates a second embodiment of the present invention.

BEST MODE FOR CARRYING OUT THE INVENTION

Figure 1:
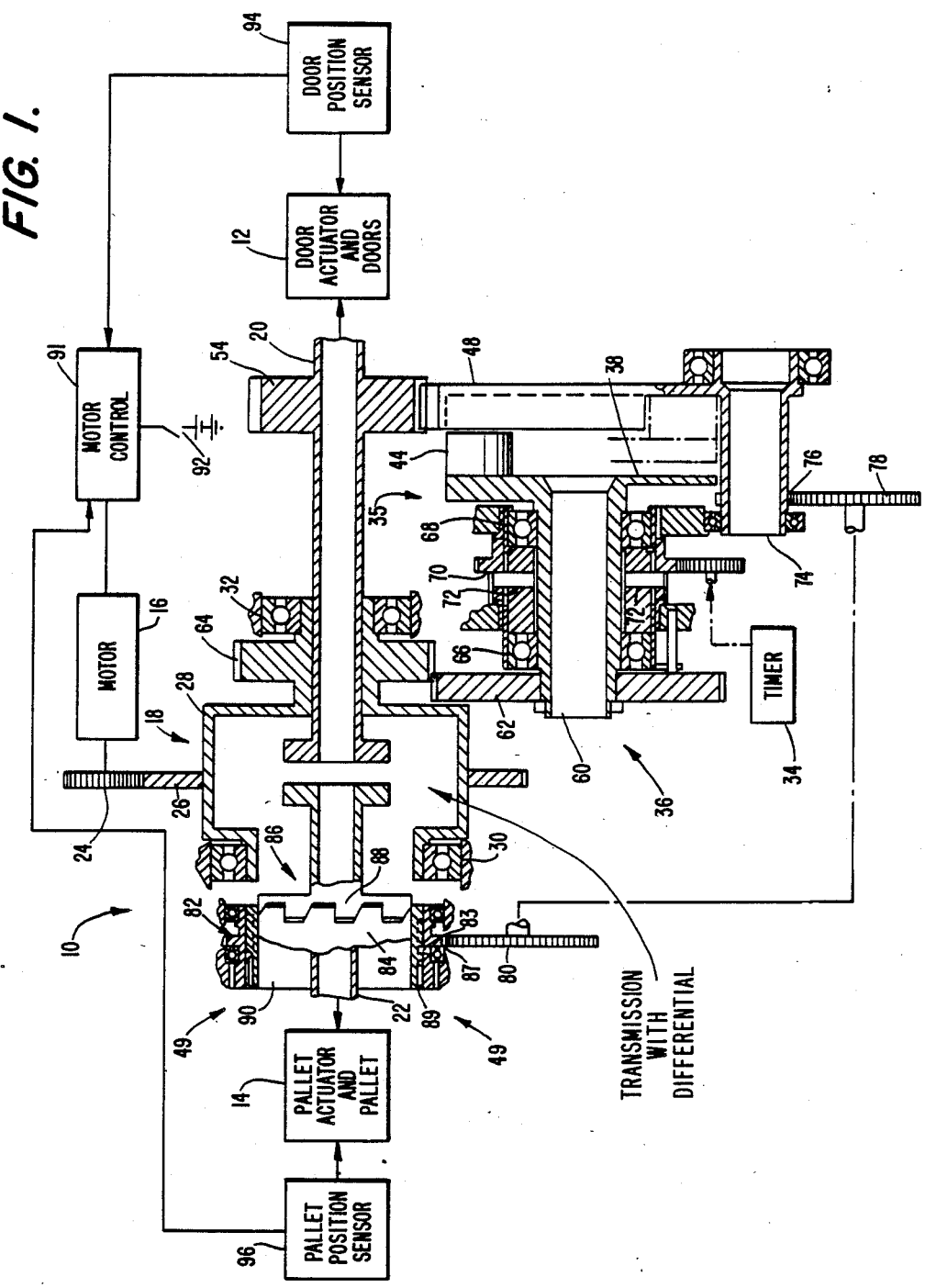
FIG. 1 illustrates a first embodiment of the present invention.

FIG. 1 illustrates a first embodiment 10 of the present invention. The first embodiment functions to sequentially activate a door actuation mechanism and doors 12 to move the doors from a first closed position to a second open position and back to a closed position in synchronism with the activation of a pallet actuator and pallet 14 to move the pallet from a first position within the airplane to a second position outside an airplane after the doors have opened and then to withdraw the pallet mechanism back within the airplane and to cause the doors to move from the second position to the first closed position. The door actuator and doors 12 and pallet actuator and pallet 14 are of conventional construction and are hereinafter not described. The precise sequencing of the doors and pallets in moving from the first position to the second position and back to the first position is preferably such that the doors move from the first position as illustrated at point A in FIG. 4A to the second position as illustrated at point A in FIG. 4A to the second position as illustrated t point B with the movement of the pallet from the first position as indicated at point D to complete the first half of operation.

Figure 1A:
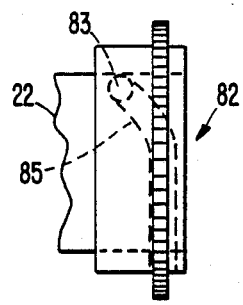
FIG. 1A is a fragmentary view of FIG. 1 illustrating the axial cam.
Figure 4A:
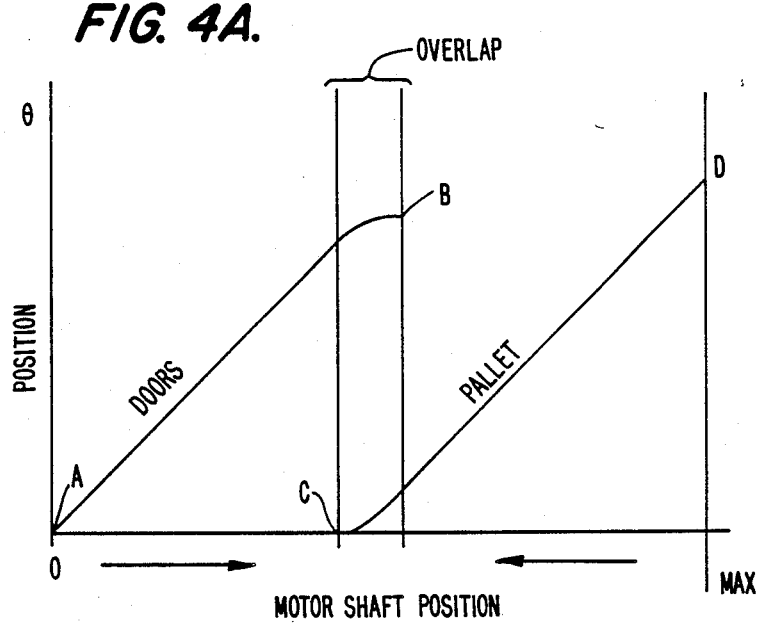
FIGS. 4A and 4B are timing diagrams of the operation of the first embodiment of the present invention.

The second half of the operation with reference to FIG. 4A is that the pallet moves from its second position which is point D to its first position which is point C and then the doors move from their second position as identified by point B to their first position as identified by point A. Motion of the doors and pallet during the sequential operation has an overlap zone in which both the doors and the pallet are moving which is identified by "overlap" in FIG. 4A. A motor 16 supplies rotary power to a transmission 18 which first and second drive shafts 20 and 22, respectively. The transmission 18 is driven by gear 24 which meshes with ring gear 26 which is attached to housing 28. The housing is rotatably supported by a pair of bearings 30 and 32. While the precise structure is not illustrated, the transmission includes a differential controlling the velocity of outputs 20 and 22. In other words, the sum of the rotational velocities of the shafts 20 and 22 is constant for a constant input speed from motor 12. Rotary motion of the shaft 20 causes the door actuator and doors to open and close depending upon the direction of rotation of input power to the transmission 18. Rotary motion of the shaft 22 causes the pallet actuator and pallet 14 to open or close depending upon the direction of rotation of the input power to the transmission 18. Timer 34 controls a geneva shifting mechanism 36 which activates a jaw clutch shifting mechanism 49 described below. The timer 34 is driven by a linkage to the motor (not illustrated) and activates an axial cam 70 to cause an inverse geneva wheel 48 to achieve the velocity characteristic of FIG. 4B. The axial cam 70 is of a similar construction to that illustrated in FIG. 1A.

Figure 2:
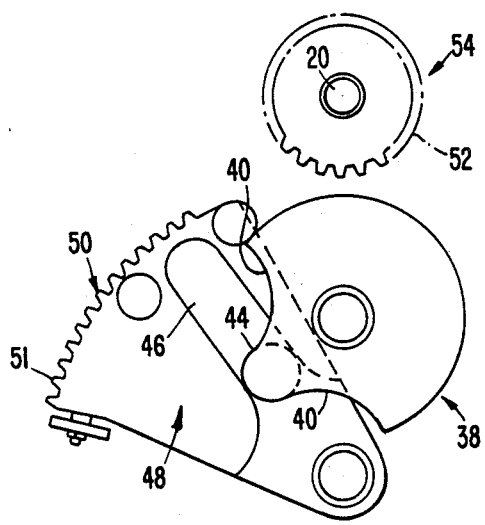
FIG. 2 illustrates the positioning of the inverse geneva mechanism used for control of the actuation of the door actuator at the start of operation of the motor of the first embodiment of the invention.
Figure 3:
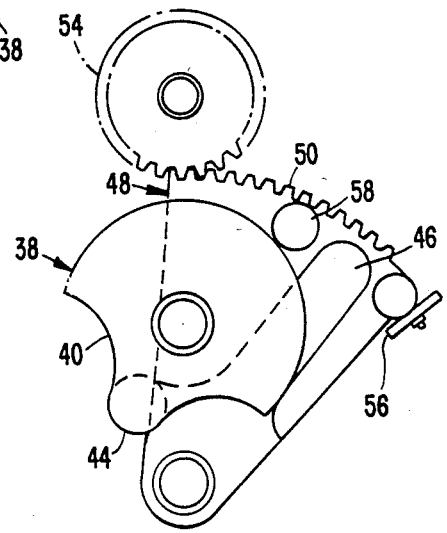
FIG. 3 illustrates the positioning of the inverse geneva mechanism at the time of the door mechanism being fully open of the first embodiment of the invention.
Figure 4B:
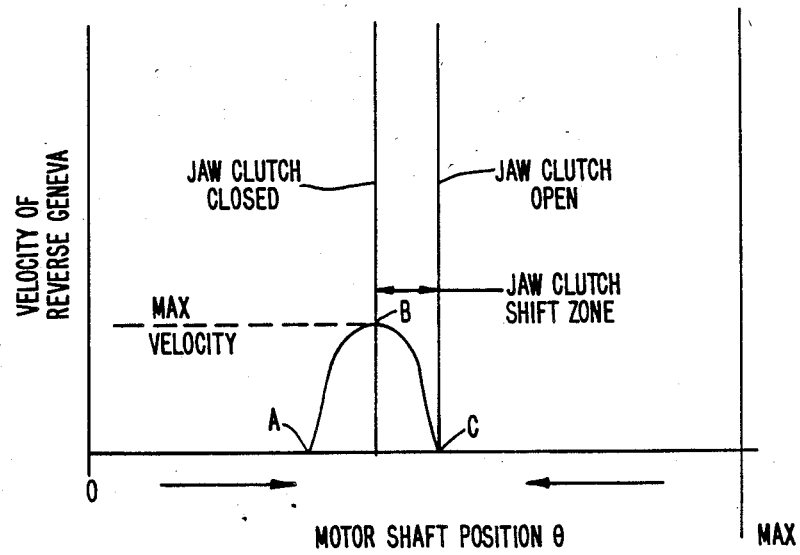

A first grounding mechanism 35 is provided for preventing rotation of the shaft 20 during the portion of motion identified in FIG. 4A on the line labeled "pallet" to the right of the point B and is an integral part of the geneva shifting mechanism 36 as described below. The first grounding mechanism 35 includes an axially shiftable plate 38. As best illustrated in FIG. 2, the plate 38 includes a cam surface 40 which engages a pin 42 which guides a pin 44 within a slot 46 of inverse geneva mechanism 48. As illustrated in FIG. 2, the output shaft 20 is free to rotate and as will be described later on, the output shaft 22 is currently fixed by a second grounding mechanism 49 described below. The outside periphery of the geneva mechanism 48 is a sector gear 50 having a plurality of teeth 51 which upon clockwise rotation engage the teeth 52 of gear 54. Upon rotation of the plate 38 in a clockwise direction, the pin 44 rotates into the slot 46 to cause the inverse geneva mechanism 48 to accelerate from a stop up to a velocity matching the output velocity of the shaft 20 when the shaft 22 is fixed by grounding mechanism 49. The acceleration of the teeth 51 to a rotational velocity matching the rotational velocity of the teeth 52 insures a smooth meshing of the teeth as the inverse geneva mechanism 48 rotates to the right until it contacts stop 56 as illustrated in FIG. 3. As indicated in FIG. 3, when the stop 56 is contacted by the right-hand edge of the geneva mechanism 48, the teeth 52 of gear 54 still engage the teeth 50. As illustrated in FIG. 4B, the inverse geneva mechanism rotates clockwise past the point of first engagement with gear 54 and the shaft 20 is deaccelerated as indicated between points B and C. In FIG. 3 pin 58 intercepts the outside periphery of wheel 38 to hold the shaft 20 in a fixed position against stop 56 thereby causing the differential of the transmission 18 to output maximum velocity to the shaft 22.

Figure 1B:
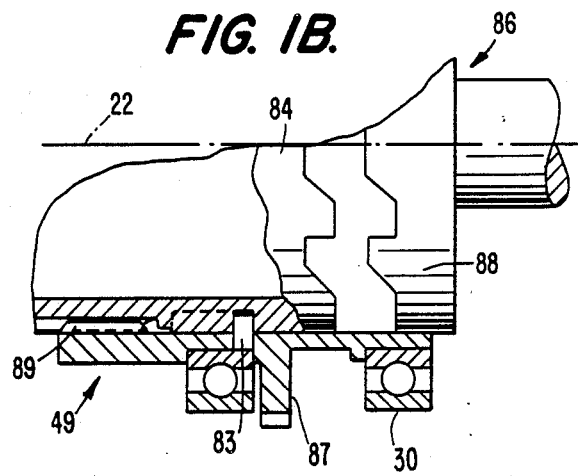
FIG. 1B is a fragmentary view of FIG. 1 illustrating the second position of the jaw clutch.

The pin 44 traces a helix during translation of shaft 60 between a first position as illustrated in FIG. 1 to a second position wherein the pin 44 is illustrated in phantom in the slot at the bottom of the inverse geneva mechanism 48 under the control of the timer 34. The shaft 60 is continually rotated by gear 62 which meshes with gear 64 which is continually driven by the rotation of the housing 28. The shaft 60 is rotatably supported by a pair of bearings 66 and 68. The axial cam 70 shifts the shaft between the first and second positions and back to the first position as directed by the inverse geneva wheel position controlled by timer 34. The axial cam 70 has a cam surface which rides on pin 72 which is grounded to the housing. The axial position of the cam surface varies as a function of circumferential position to caues translation of the shaft 60 to cause the pin 44 to move in a helical manner as described above. Although not illustrated, pin 44 in slot 46 completes a gear drive to cause rotation of shaft 74 so that the rotation of the shaft 74 is synchronized with the rotation of shaft 60 and shaft 20. Gear 76 on the outside circumference of the shaft 74 drives gear 78 which drives gear 80. The gear 80 activates axial cam 82 which has a similar construction to the axially cam 70. The axial cam 82 has a pin 83 illustrated in FIG. 1A which rides in a curved slot 85 which causes jaw clutch 86 to translate axially in response to gear 87 being rotatably driven by gear 80. The second grounding mechanism 49 is provided for preventing rotation of shaft 22 for the portion of the operational sequence which is to the left of point C in FIG. 4A. The grounding mechanism 49 is controlled by the axial cam 82 described above which shifts between a second position illustrated in FIG. 1B in which shaft 22 is free to rotate and a first position in which shaft 22 is not free to rotate. In the first position as illustrated in FIG. 1, the first surface 84 of a jaw clutch 86 is axially shifted by the axial cam 82 to engage a second surface 88 of the jaw clutch. The first surface of the jaw clutch is slidably mounted within the bore 90 by means of a splined connection 89 which prevents rotation of the first surface. Accordingly, when the axial cam 82 shifts the first surface 84 to the position as illustrated in FIG. 1, the shaft 22 is prevented from rotating which causes all of the rotary motion from the rotation of the housing 28 to be translated to the shaft 20. The jaw clutch 86 is advantageous in that the teeth of the opposed faces prevent substantial slippage to help maintain the desired timing between the actuation of the doors and the pallet. During the overlap period, the inertia of the deaccelerating actuation system to provide for smooth operation without substantial jarring such as when a mechanical stop is used to control motion of the actuation system.

FIG. 4B illustrates the velocity of the inverse geneva mechanism 48 as a function of the position of the shaft of the motor. The cycle of opening the jaw clutch 86 from a closed position at which the door actuator and doors 12 are free to rotate to a point where the jaw clutch 86 is fully open is illustrated. As indicated at point A of rotation of the motor 16, the inverse geneva mechanism 48 starts to accelerate toward a maximum velocity. Point A corresponds to the position of the inverse geneva mechanism 48 as illustrated in FIG. 2. Point B corresponds to the position at which the jaw clutch 86 is closed that is the right most extension of the first surface 84 in the bore 90 along the axial splines 89 contained therein. At point B, the geneva has caused engagement of the first teeth 51 of the sector gear 50 with gear 54 and taken the load off of the jaw clutch 86, allowing it to open. The velocity of the inverse geneva mechanism 48 decreases to zero at point C which corresponds to the position illustrated in FIG. 3 to accelerate shaft 22 to full speed. At point C the shaft 20 is fixed by grounding mechanism 35 which causes all of the power from the rotation of the housing 28 to be transferred to shaft 22. Plate 38 forms a full circle (not shown) in the plane of pins 58 to complete the ground.

The motor 16 is controlled by a motor control 91 which receives input from a start switch 92, door position sensor 94 and pallet position sensor 96. The start switch is the mechanism for initiating rotation of the motor 16, which in aircraft applications, is preferably a hydraulically powered motor but is should be understood that the invention is not limited thereto. The function of the motor control 91 is to initiate rotation of the motor 16 in a first direction, to control reversal of the rotation of the motor 16 when the pallet position sensor 96 signals that the pallet has reached point D as illustrated in FIG. 4A and to shut off the motor 16 when after reversal of the direction of rotation of the motor 16, the doors have reached point A. It should be understood that while the sensors 94 and 96 have been indicated as being connected to respectively the door actuator and doors 12 and the pallet actuator and pallet 14, the sensors may be dispensed with the backlash has been reduced to acceptable levels in the mechanical linkages linking the motor with the actuators 12 and 14. In this circumstance, the position of the shaft of the motor 16 may be read in lieu of providing separate door position and pallet position sensors 94 and 96 by a suitable shaft position sensor (not illustrated).

Reversal of the sequence of operation described in FIG. 4A is initiated by the sensing of the pallet reaching point D by either the aforementioned sensors of sensing of shaft position. The sequence of the operation of the reverse geneva mechanism 48 is exactly the opposite of that described above with reference to FIGS. 2 and 3 and the sequence of the operation of the axial cam 82 in moving the jaw clutch 86 between its first and second positions is also reversed. Specifically, with reference to FIG. 3, the direction of rotation of the shaft 60 is reversed which when triggered by the timing mechanism, causes the pin 44 to move outward in the slot 46 of the inverse geneva mechanism 48 to cause a counterclockwise rotation as the wheel 38 carrying the pin 44 rotates while increasing the velocity of the teeth 51 thereby causing the gear 54 to increase in velocity and shaft 22 to lose velocity. After the jaw clutch 86 starts to close, the right-most tooth 51 of the sector gear 50 clears the teeth of the gear 54, the shaft 20 is free to rotate under power applied by the motor 16 by means of rotation of the housing 28 through differential action of the transmission 18. Moving to the left in FIG. 4B, point B illustrates the point at which the teeth 51 clear the teeth of the gear 54. Rotation of the plate 38 carrying the pin 44 thereafter causes the inverse geneva mechanism 48 to decelerate as illustrated by the curve from point B to point A. As illustrated in FIG. 4B, at point B the jaw clutch 86 is fully closed. Thereafter, the inverse geneva mechanism 48 is grounded until the motor stops at point 0.

FIG. 5 illustrates a second embodiment of the invention 100. Like parts are identified by like reference numerals in FIGS. 1 and 5. The embodiment of FIG. 5 differs from FIG. 1 in that the transmission 18 does not include a differential for controlling the output rotational velocity of the shafts 20 and 22 and does not include the second grounding mechanisms 35. In order to simplify the drawing, the detail of the grounding mechanism 35 has been omitted which, as illustrated in FIG. 5, causes the pallet actuator and pallet 12 to be grounded. However, it should be understood that the grounding mechanism using the inverse geneva mechanism may be identical to that illustrated in FIG. 1. Furthermore, the second embodiment mechanically disengages the shafts 20 and 22 during time intervals when they are not to run. Instead, the rotation of the shafts 20 and 22 is controlled by the engagement of jaw 102 with the jaws 104 and 106 engages the jaw 102 except for the position of the motor shaft of FIG. 6B labelled "zone 2" where both are engaged simultaneously. The output shaft 108 for motor 16 drives gear 110 which meshes with gear 112 which rotatably drives the axially fixed jaw 102. An axial shifting mechanism 114 is provided for axially shifting the jaws 104 and 106 to selectively engage the stationary jaw 102. Like the first embodiment, the jaw clutch provided by the opposed faces of the jaws 102, 104 and 106 helps prevent substantial slippage to help maintain the desired timing between the actuation of the doors and the pallet. As illustrated in FIG. 5, the axial shifting mechanism 114 translates the jaw 104 and shaft 22 to the left. At a center point, as illustrated in FIG. 6B, the jaws 104 and 106 both engage the stationary jaw 102 to cause both drive shafts 20 and 22 to be driven by the same rotational velocity. Then, axial shift mechanism 114 continues to the left pulling jaw 106 out of engagement.

The axial shifting mechanism 114 includes a stationary threaded shaft 116 which engages a crown gear 118 which engages the housing 120 in which shafts 20 and 22 are journalled by bearings not illustrated. As inverse geneva mechanism 120 similar to the inverse geneva wheel described above has teeth 124 engaging teeth 126 of the crown gear 118 to translate from a first position as illustrated to a second position to the left where stop 128 contacts stop 130. Stops 130 and 132 are an added feature which are not needed if the inverse geneva wheel 120 has a grounding device. A grounding device may be used in the second embodiment like the grounding device of the first embodiment. The shaft 140 is synchronously driven by linkage 133. Reversal of the direction of rotation of the crown gear 118 causes the crown gear to translate from the second position back to the first position as illustrated where stop 132 contacts stop 134. Timer 34 operates in a manner analogous to that described above with regard to FIG. 1. The timer 34 is synchronously driven by the motor 16 by a suitable linkage 135 to provide a time reference with regard to the overall position of the doors and pallet in the operation cycle described above. An axial shifting mechanism illustrated generally by the bidirectional arrow translates the pin 44 through a helical path analogous to that described above with reference to FIG. 1. The axial shifting mechanism may be similar to the shifting mechanisms 70 and 82 described above with reference to FIG. 1. As illustrated in FIG. 5, the gear 118 starts in it's grounded position. As the pin continues to rotates under drive applied from the motor 16, the pin rotates outward in the slot (not illustrated) in the inverse geneva wheel 120 causing the crown gear 118 to translate to the left and come up to the rotational velocity necessary to drive jaw 104 at the same velocity as jaw 102 to cause a smooth engagement by the application of torque to gear 142 which is connected to the jaw 104 and shaft 22. Similarly, when the crown gear 118 translates further to the left, it engages gear 144 and disengages gear 142. When the timer 34 reverses the direction of rotation of the shaft 140, the pin 44 accelerates the inverse geneva wheel 120 which accelerates the crown gear 118 up to a velocity to accelerate the jaw 106 via torque transmitted through the gear 144 to match the rotational velocity of the jaw 102 to cause a smooth engagement between the jaws as they travel back to the right. Thus, it is seen that like the first embodiment of the present invention, rotary power is sequentially applied to the shafts 20 and 22, driving door actuator and doors 12 and pallet actuator and pallet 14.

Figure 6A:
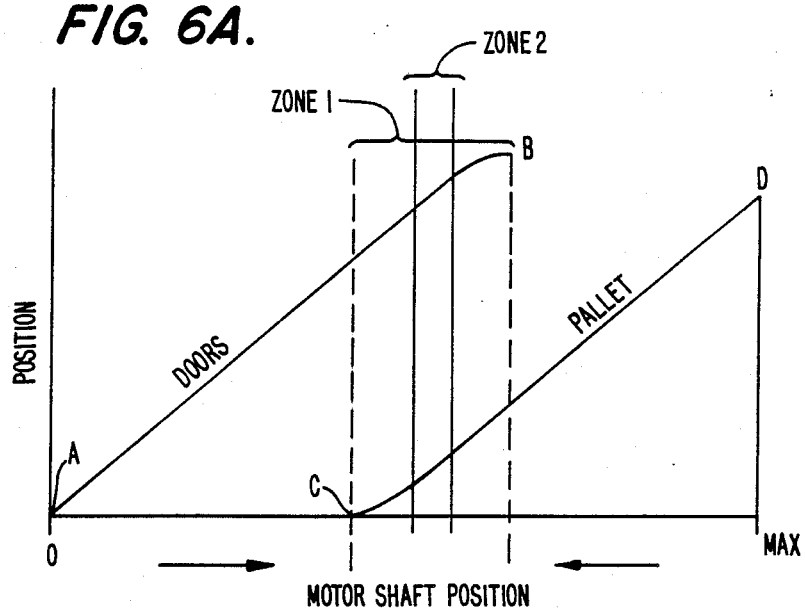
FIGS. 6A and 6B are timing diagrams of the operation of the second embodiment of the invention.
Figure 6B:
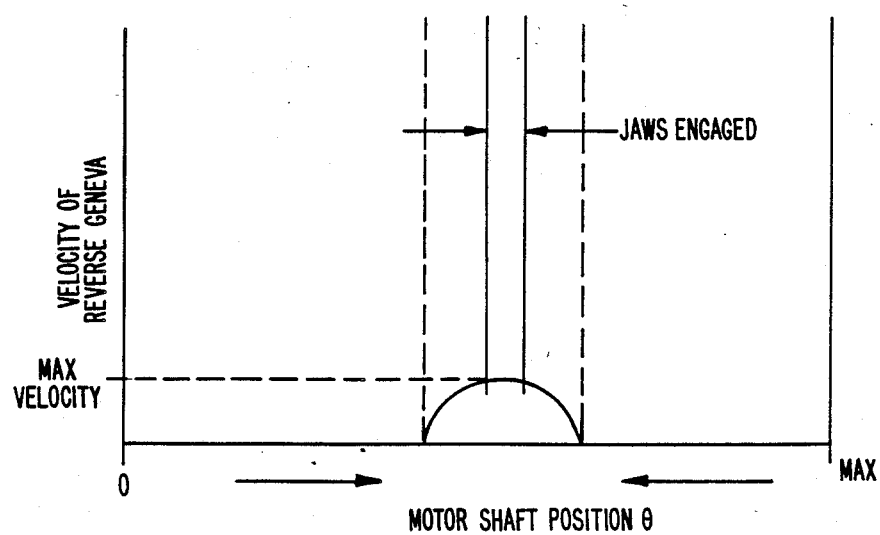

FIG. 6A illustrates a graph of the position of the doors and pallet as a function of the angular position of the motor 16. The reference letters "A-D" identify the same positions as discussed above with reference to FIG. 4A. The "zone 1" illustrates the range of angular motion of the motor 16 in which the doors and the pallet are both in motion. The "zone 2" illustrates the range in which the jaws 102, 104 and 106 are all engaged.

FIG. 6B illustrates the velocity of the inverse geneva mechanism 120 as a function of motor position for motion in both directions. The timer 34 controls the time at which the inverse geneva mechanism is activated.

While the invention has been illustrated in terms of its preferred embodiments, it should be understood that numerous modifications may be made thereto without departing from the spirit and scope of the invention as defined in the appended claims. For example, it should be understood that the invention may be practiced with the use of a geneva mechanism in place of the inverse geneva mechanism. It is intended that all such modifications fall within the scope of the appended claims. It should be clearly understood that while the preferred implementation of the invention is to sequence the timed actuation of door and a pallet actuators on an airplane, nevertheless, the invention may be utilized in other applications requiring the sequential activation of a plurality of actuators in which each actuator is moved from a first position to a second position and back to the first position under the control of a single prime mover.

I claim:

1. A system for sequentially activating a plurality of actuation systems in a timed sequence comprising:
    (a) a first actuation system to be actuated to move between a first position and a second position and back to the first position;
    (b) a second actuation system to be actuated to move between a first position and a second position and back to the first position, the motion of the second actuation system being sequential with the motion of the first actuation system;
    (c) a transmission having an input, a first output mechanically connected to the first actuation system with the first output being free to rotate when the first actuation system is at the first position and is fixed when the first actuation system is in the second position and a second output mechanically connected to the second actuation system with the second output being fixed when the second actuation system is in the first position and is free to rotate when the second actuation system is in the second position and with both the outputs rotating during a common time interval of the sequential activation of the plurality of activation systems;
    (d) a single motor, coupled to the input of the transmission, for applying power to the transmission for supplying power to move the first and second actuation systems; and
    (e) a timer for controlling the moving of the first and second actuation systems between the first and second positions and back to the first position.

2. A system in accordance with claim 1 further comprising:
    (a) means for activating the motor and wherein;
    (b) when the motor is initially activated the actuation systems are positioned in the first position and the first actuation system is driven by the transmission from the first position toward the second position with the second actuation system being stopped upon initial activation of the motor, thereafter the timer causes the transmission to deactivate movement of the first actuation system when the first actuation system reaches the second position, the timer causes the transmission to drive the second actuation system from the first position to the second position at a time after the first actuation system is moving toward the second position, when the second actuation system reaches the second position the means for activating the motor causes a direction of rotation of power applied to the transmission by the motor to be reversed and the transmission causes the second actuation system to move from the second position toward the first position, the timer causes the transmission to stop activation of the second actuation system when the second actuation system reaches the first position, the timer causes the transmission to drive the first actuation system from the second position to the first position, and when the first actuation system reaches the first position the means for activating the motor deactivates the motor.

3. A system in accordance with claim 2 wherein the transmission comprises:
    (a) a differential rotationally driven by the motor and with outputs respectively being the first and second rotary outputs for respectively driving the first and second actuation systems;
    (b) means, responsive to the timer, for preventing rotation of the first output during at least a portion of the driving of the second actuation system;
    (c) means, responsive to the timer, for preventing rotation of the second output during at least a portion of the driving of the first actuation system; and wherein;
    (d) the timer causes the means for preventing rotation of the first and second outputs to sequentially stop the rotation of the second output and the first input.

4. A system in accordance with claim 3 wherein the transmission further comprises:
    (a) a jaw clutch movable between first and second positions with the first position permitting the second output to rotate and the second position preventing the second output from rotating with the clutch including the means for preventing rotation of the second output;
    (b) means for shifting the clutch from the first position to the second position and from the second position to the first position in response to the timer with the timer causing the clutch to be positioned in the second position during at least a portion of a time interval that the first output is free to rotate by the means for preventing the rotation of the first output;

(c) A gear, coupled to the first output, with the gear having a plurality of teeth extending around an outer circumference of the gear;

(d) a wheel rotationally mounted and having a plurality of teeth mounted therein extending partially around an outer circumference and which engage the teeth of the gear when the wheel is rotated to a circumferential position at which the teeth of the wheel face the gear; and wherein;

(e) the timer causes the wheel to be accelerated to a rotational velocity matching a rotational velocity of the gear by a time at which the teeth of the gear and the wheel engage and the clutch is moving from the second position to the first position.

5. A system in accordance with claim 4 further comprising:

(a) an inverse geneva mechanism within the wheel with the inverse geneva mechanism having a slot extending radially outward from an axis of rotation; and (b) means for engaging the slot of the inverse geneva mechanism and causing rotation of the inverse geneva mechanism to accelerate the wheel up to a rotational velocity of the gear during movement of the clutch from the second position to the first position mechanism to deaccelerate the wheel and the gear to prevent the first output from rotating.

6. An actuator in accordance with claim 5 wherein the means for preventing rotation of the first mechanism comprises:

(a) a stop for stopping rotation of the wheel; and (b) a stop carried by the wheel for stopping motion of the means for engaging the slot of the inverse geneva when the first actuation system is prevented from rotating.

7. A system in accordance with claim 6 wherein the means for engaging comprises:

(a) a pin mounted on a rotatable radius with the radius being axially movable between first and second positions; and (b) means for rotating and moving the pin between the first and second axial positions to cause the pin to move in a helix axially with the pin engaging the slot of the inverse geneva mechanism when the radius is moving toward the second position.

8. A system in accordance with claim 5 wherein:

(a) the timer causes the jaw clutch to be positioned in the first position during a time interval that the second output is free to rotate by the means for preventing rotation of the second output; and (b) the timer causes the wheel to be accelerated to cause the jaw clutch to move from the first position to the second position and thereafter causes the wheel to be deaccelerated after the teeth of the gear and the wheel disengage.

9. A system in accordance with claim 1 wherein:

(a) the first actuation system actuates opening and closing of doors of an airplane; and (b) the second actuation system actuates lowering of a pallet through the open doors of the airplane.

10. A system for sequentially activating a plurality of actuation systems in a timed sequence comprising:

(a) a first actuation system to be actuated to move between a first position and a second position and back to the first position;

(b) a second actuation system to be actuated to move between a first position and a second position and back to the first position, the motion of the second actuation system being sequential to the motion of the first actuation system;

(c) a transmission having an input, a first output mechanically connected to the first actuation system with the first actuation system being connected to the input when the first actuation system is at the first position and being disengaged from the input when the first actuation system is at the second position and a second output mechanically connected to the second actuation with the second actuation system being connected to the input when the first actuation system is at the second position and being disengaged from the input when the first actuation system is at the first position and with both outputs rotating during a common time interval of the sequential activation of the plurality of actuation systems;

(d) means for synchronizing the rate of rotation of one of the first and second outputs, whichever is not connected to the input, that is to be connected to the input prior to engagement with the input, with rate of rotation of the input;

(e) a single motor, coupled to the input of the transmission, for applying power to the transmission for supplying power to move the first and second actuation systems; and (f) a timer for controlling the timing of moving the first and second actuation systems between the first and second positions and back to the first position.

11. A system in accordance with claim 10 further comprising:

means for grounding the second actuation system during at least a position of the actuation of the first actuation system.

12. A system in accordance with claim 11 wherein:

(a) the means for grounding includes an inverse geneva mechanism having a slot extending radially outward from an axis of rotation; and (b) means for engaging the slot of the inverse geneva mechanism to drive the inverse geneva mechanism;

(c) a stop for stopping rotation of the inverse geneva mechanism; and (d) a stop carried by the geneva mechanism for stopping motion of the means for engaging.

13. A system in accordance with claim 12 wherein:

(a) means for activating the motor and wherein:

(b) when the motor is initially activated the actuation systems are positioned in the first position and the first actuation system is driven by the transmission from the first position toward the second position with the second actuation system being stopped upon initial activation of the motor, thereafter the timer causes the transmission to deactivate movement of the first actuation system when the first actuation system reaches the second position, the timer causes the transmission to drive the second actuation system from the first position to the second position at a time after the first actuation system has started to move to the second position, when the second actuation system reaches the second position the means for activating the motor causes a direction of rotation of power applied to the transmission by the motor to be reversed and the transmission causes the second actuation system to move from the second position toward the first position, the timer causes the transmission to stop the second actuation system when the second actuation system reaches the first position, the timer causes the transmission to drive the first actuation system from the second position to the first position, and when the first actuation system reaches the first position the means for activating the motor deactivates the motor.

14. A system in accordance with claim 13 wherein:
(a) the input is axially fixed in position;
(b) the first and second outputs are spaced apart by a constant distance and are axially movable with respect to a rotating element of the input between first and second positions, at the first position the rotating element only engages the first output to apply rotary power thereto and at the second position the rotating element only engages the second output and further comprising;
(c) means, responsive to the timer, for shifting the first and second output axially between the first and second positions to sequentially engage the first and second outputs.

15. A system in accordance with claim 14 wherein:
the means for synchronizing is responsive to the timer, and accelerates the output, which is not coupled to the input, to a rotational velocity matching the input prior to the means for shifting causing engagement of the output, not coupled to the input, with the input.

16. A system in accordance with claim 14 wherein the means for shifting comprises:
(a) a threaded shaft which is fixed to prevent rotation;
(b) a gear having a threaded bore which engages the threaded shaft and the first and second outputs and an outside circumference having gear teeth;
(c) a wheel, driven by the motor under the control of the timer, having teeth on an outside periphery which engages the teeth of the gear, the wheel causing the gear to traverse along the threaded shaft between a first position to a second position in response to the motor causing the wheel to rotate in a first direction and the wheel causing the gear to traverse along the threaded shaft between the second position and the first position in response to the motor causing the wheel to rotate in the second direction.

17. A system in accordance with claim 16 wherein:
(a) the wheel, responsive to the timer, accelerates the output, which is not coupled to the input, to a rotational velocity matching the input prior to the means for shifting causing engagement of the output, not coupled to the input, with the input.

18. A system in accordance with claim 17 wherein:
(a) the wheel contains the inverse geneva mechanism with the radially outward extending slot and further comprising:
(b) a pin mounted on a radius with the radius being axially movable between the first and second positions; and
(c) means, responsive to the timer, for rotating and moving the pin between the first and second axial positions to cause the pin to move in a helix with the pin engaging the slot of the inverse geneva mechanism when the radius is moving toward the second position.

19. A system in accordance with claim 10, wherein:
(a) the first actuation system actuates the opening and closing of doors of an airplane; and
(b) the second actuation system actuates lowering of a pallet through the open doors of the airplane.

* * * * *